(12) United States Patent
Li et al.

(10) Patent No.: US 9,106,926 B1
(45) Date of Patent: Aug. 11, 2015

(54) USING DOUBLE CONFIRMATION OF MOTION VECTORS TO DETERMINE OCCLUDED REGIONS IN IMAGES

(75) Inventors: Qiang Li, Shanghai (CN); Neil D. Woodall, Newport Beach, CA (US)

(73) Assignee: Pixelworks, Inc., Portland, OR (US)

( * ) Notice: Subject to any disclaimer, the term of this patent is extended or adjusted under 35 U.S.C. 154(b) by 908 days.

(21) Appl. No.: 13/327,634

(22) Filed: Dec. 15, 2011

Related U.S. Application Data

(63) Continuation of application No. 12/970,760, filed on Dec. 16, 2010, now abandoned.

(51) Int. Cl.
*H04N 19/553* (2014.01)
*H04N 19/577* (2014.01)

(52) U.S. Cl.
CPC .................................. *H04N 19/553* (2013.01)

(58) Field of Classification Search
CPC .................................................... H04N 19/553
USPC ..................................................... 375/E7.117
See application file for complete search history.

(56) References Cited

U.S. PATENT DOCUMENTS

2009/0208123 A1* 8/2009 Doswald ...................... 382/236

OTHER PUBLICATIONS

Biswas, Mainak, and Truong Nguyen. "A novel motion estimation algorithm using phase plane correlation for frame rate conversion." Signals, Systems and Computers, 2002. Conference Record of the Thirty-Sixth Asilomar Conference on. vol. 1. IEEE, 2002.*

* cited by examiner

*Primary Examiner* — Sath V Perungavoor
*Assistant Examiner* — Clifford Hilaire
(74) *Attorney, Agent, or Firm* — Marger Johnson & McCollom PC

(57) ABSTRACT

An apparatus includes a phase plane conversion module to convert image data into at least two phases, a current phase and a previous phase, a first phase motion vector calculation module to generate a first phase motion vector field, a second phase motion vector calculation module to generate a second phase motion vector field, and a double check module to determine which vectors in the first and second phase motion vector fields are double confirmed and to identify regions in which the motion vectors are not double confirmed as occluded.

12 Claims, 5 Drawing Sheets

USING DOUBLE CONFIRMATION OF MOTION VECTORS TO DETERMINE OCCLUDED REGIONS IN IMAGES

CROSS-REFERENCE TO RELATED APPLICATIONS

This application is a Continuation of co-pending U.S. application Ser. No. 12/970,760, filed Dec. 16, 2010, entitled USING DOUBLE CONFIRMATION OF MOTION VECTORS TO DETERMINE OCCLUDED REGIONS IN IMAGES, the disclosure of which is herein incorporated by reference in its entirety.

BACKGROUND

Frame interpolation creates an image frame from neighboring images. The neighboring images may be fields in an interlaced video format, used to form a frame of data, or neighboring frames of a soon-to-be-created frame.

In the simplest approach, one could increase the frame rate by repeating the most recent frame until the next frame is ready for display. However, this does not account for moving objects which may appear to jump from frame to frame and have flickering artifacts.

Motion estimation and motion compensation techniques may alleviate some of these issues. These techniques rely upon motion vectors to shift the image data for the moving object to the correct position in interpolated frames, thereby compensating for the motion of the object. Difficulties arise in the estimation of motion and the selection of the correct motion vector in the regions of the image where the moving object resides. These regions may have background areas that are initially uncovered in the background, but become covered by the object in motion. Similarly, these background regions may be initially covered by the object, and then become uncovered as the object moves away. In either case, selection of motion vectors becomes difficult. These regions will be referred to as 'occluded.'

By determining where these areas occur in the images allows those areas to receive further processing, resulting in better image quality.

DETAILED DESCRIPTION OF THE EMBODIMENTS

In order to increase the quality of video images, many imaging systems employ frame interpolation, a process that creates extra frames in the video stream. Since video streams include moving objects, the system has to estimate and then compensate for motions of objects in the image data. Two common methods are phase plane correlation (PPC) and 3D recursive.

The process to arrive at this interpolated motion detector may take many paths. In this particular diagram, the current frame (CF) and the previous frame (P1) have undergone Fourier transformation to the phase plane in a process of phase plane correlation (PPC). This transformation lends itself well to motion analysis because motion in images appears in the Fourier plane as large peaks.

Once the PPC process completes, the process performs motion analysis by generating a set of candidate motion vectors for each block of the interpolated frame. These candidate motion vectors may result from other methods of motion estimation, such as three dimensional recursive analysis. A prospective interpolated motion vector will then typically be selected from the set of candidate motion vectors by selecting the motion vector that minimizes the difference between the blocks of pixels in the CF and PF or by minimizing the difference between motion vectors in adjacent blocks.

Typically, in a 3D recursive algorithm, the motion vectors are calculated for each output frame. If the output frame is the previous frame of the original image (P1), we refer to that as Phase 0, if the output frame is the current frame of the original image (CF), we refer to that as Phase 1. If the output frame is in between the P1 and CF frames, then the phase is a number between 0 and 1. In the 3D recursive algorithm, the phases are typically calculated going from 0 to 1 in a monotonic fashion. Furthermore, phase 1 is typically never calculated because it has no value. In the double confirm process, we will not only calculate phase 1, but also do so before any intermediate phases. While the process is illustrated using a 3D recursive algorithm, any process that generates motion vectors for both phase 0 and phase 1 can be used.

Figure 1:
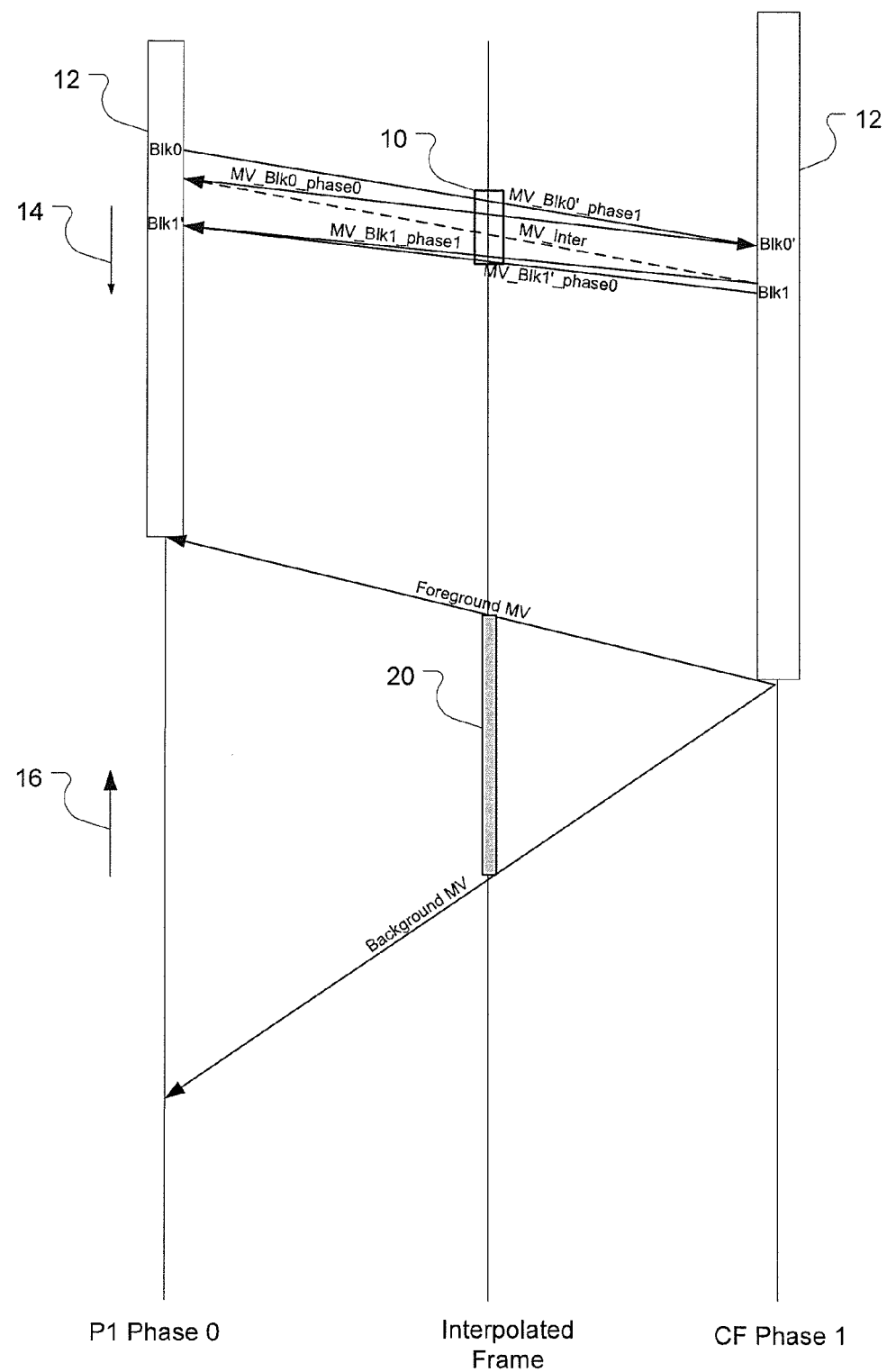
FIG. 1 shows a diagram of motion vector for non-occluded regions between phases of an image and an interpolated frame.

FIG. 1 shows an example of an interpolated motion vector, shown by the dashed line, for a block 10 in an interpolated frame. The imaging system needs to determine if that interpolated motion vector points to a region that is covered or uncovered, also referred to here as occluded. As a frame results from interpolation from the neighboring frames or fields, determining whether a region is occluded allows the system to perform further processing on those regions.

In the examples given below, one must understand that these examples aim to aid in understanding, and in no way are intended to limit the scope of the claims. The use of particular block names, phase names, etc., are merely contextual and may be changed as desired by the system designer.

The interpolated motion vector in FIG. 1 corresponds to a current block 10 in the interpolated frame. The interpolated motion vector points to a block, designated Blk0, in the P1 frame, phase. The interpolated motion vector points from a block designated Blk1 in the current frame, phase 1. One should note that reference is made here to blocks and regions. Regions may be bigger than blocks. An occluded region may involve several blocks.

Generally, by comparing the corresponding motion vectors from the blocks in phase 0 and phase 1, one can determine if the interpolated motion vector corresponds to a region that is covered or uncovered. As objects move between frames of a video sequence, areas of the image become covered or uncovered. In covered regions, the motion vectors generally result from the object in the foreground, rather than the background. Issues arise in areas in which the background shows in one frame and then becomes covered in the next frame, or the reverse, where the background does not show in the first frame and has become uncovered in the next. The discussion here will refer to these regions as 'occluded.'

Occluded regions require more detailed processing than non-occluded areas. One aspect of the embodiments here allows for detection of these areas for identification for further processing. In FIG. 1, the object 12 moves downward in the direction of arrow 14. The background could then be viewed as moving 'up' in the direction of arrow 16. The shaded area 20 represents the occluded area. The current block 10 does not reside in the occluded area.

The motion vector for the current block, MV_Inter. points from the current block position to blocks in CF phase 1 and to P1 phase 0. Each of these blocks has their own motion vectors. Generally, the motion vectors are determined by going from the current block in the interpolated phase to either phase 0 or phase 1 or both. If the phase is equal to 0, then the motion vector points to a block in phase 1, if the phase is equal to 1, then the motion vector points to a block in phase 0.

In this example, the process starts with the block to which the MV_Inter points in phase 0. This block, referred to here as Blk0, has a motion vector MV_Blk0_phase0, shown on the diagram. This motion vector is then compared to the motion vector of the same block in its current position in phase 1, MV_Blk0'_phase1. Blk0' is the same block as Blk0 in phase 0, but shifted to its new position in the next frame. FIG. 1 shows these motion vectors at the top of the diagram. As seen here, these motion vectors have very little difference and are confirmed. The motion vector being analyzed has very little difference to the previous found motion vectors for phase 0 and phase 1. Since both motion vectors have a small difference, the block is considered double confirmed.

The process then moves to the block at the other end of the interpolated motion vector, MV_Inter. The tail of the motion vector originates at a block in phase 1, referred to here as Blk1. Block 1 has a motion vector, MV_Blk1_phase 1, that points to phase 0. This is compared to the motion vector at Blk1', the same block but in phase 0, MV_ Blk1'_phase0. As shown in FIG. 1, this middle group of motion vectors also have very little difference and are considered confirmed.

One should note that the amount of difference considered as 'very little difference' depends upon the system designer. Generally, this difference may take the form of a threshold. If a difference measurement exceeds a particular threshold, the motion vector is not confirmed for that block and the region becomes designated as occluded for further processing. The setting of the threshold may depend upon a desired level of accuracy, the processing power available in the system, the nature of the image data (color space, resolution, etc.), among others. Also, it should be noted, that the motion vectors represent a block of pixels. The motion vectors in general will not point to a center of a block of pixels. Several methods can be used adjust the motion vector including bi-linear interpolation, using the block with the minimum delta, using the block with the maximum delta, using the block that has the lowest SAD (sum of absolute differences) to the current block, using the block that has the lowest difference for the average brightness etc.

Alternatively, the double confirm value could be considered "fuzzy", so the double confirm value could take on multiple values representing degrees of double confirmedness. In which case, the thresholds described above would be replaced by a nonlinear function that produces several values instead of just 0 or 1.

Because both sets of motion vectors are confirmed, the interpolated motion vector MV_Inter is double confirmed. The impact of this is that the current block 10 becomes designated as not being occluded. The interpolated motion vector is used to form the image in that block of the interpolated frame.

Figure 2:
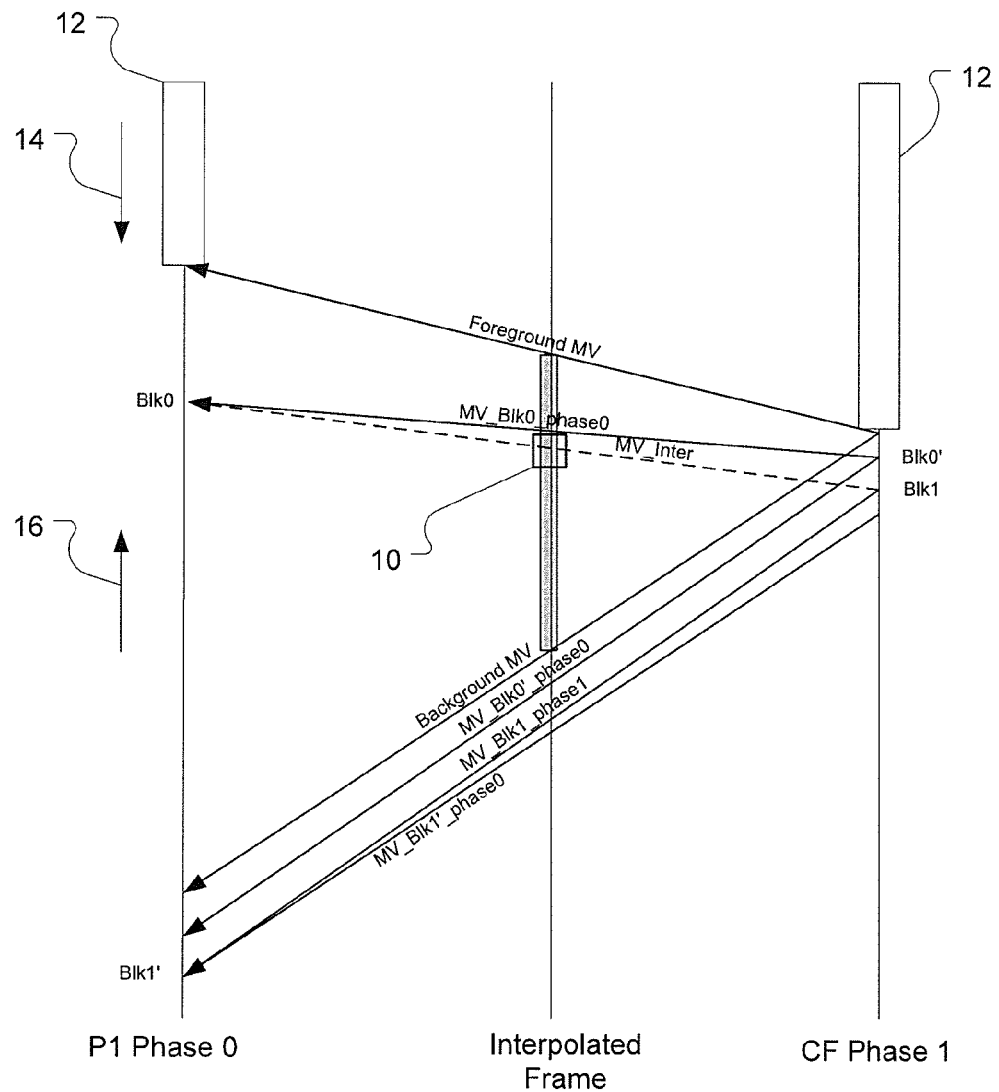
FIG. 2 shows a diagram of motion vectors for occluded regions between phases of an image and an interpolated frame.

In contrast, FIG. 2 shows a different scenario. In this scenario, the reader will see that the current block 10 resides within the occluded area 20. However, the system has not determined this condition yet. As before, the interpolated motion vector MV_Inter points from a block, Blk1, in phase 1 to a block, Blk0, in phase 0.

The motion vectors for block 0 are MV_Blk0_phase0 and MV_Blk0'_phase1. FIG. 2 shows that the first motion vector lies just above and is relatively close to MV_Inter. However, the second motion vector listed above follows a path similar to that of the background motion vector. These motion vectors have a very large difference and are not confirmed.

However, the other set of motion vectors, those for block 1, do confirm. The difference between these two vectors, MV_Blk1_phase1 and MV_Blk1'_phase0 have very little difference. FIG. 2 shows these towards the bottom of the diagram, close to the background motion vector. These two vectors have very little difference, resulting in their being confirmed. Therefore, one set of vectors are confirmed and one are not.

This condition results in the decision that the current block resides in an occluded region. The data in this block must undergo further processing to determine how much of the block is occluded, as well as making a more exact determination of the occluded region's size and shape. This leads to a more accurate selection of a motion vector for this block, resulting in a better quality image. For example, the further processing may involve a determination of which of the two non-confirmed motion vectors is the more accurate selection, or a determination that some motion vector between the two may be optimal.

Figure 3:
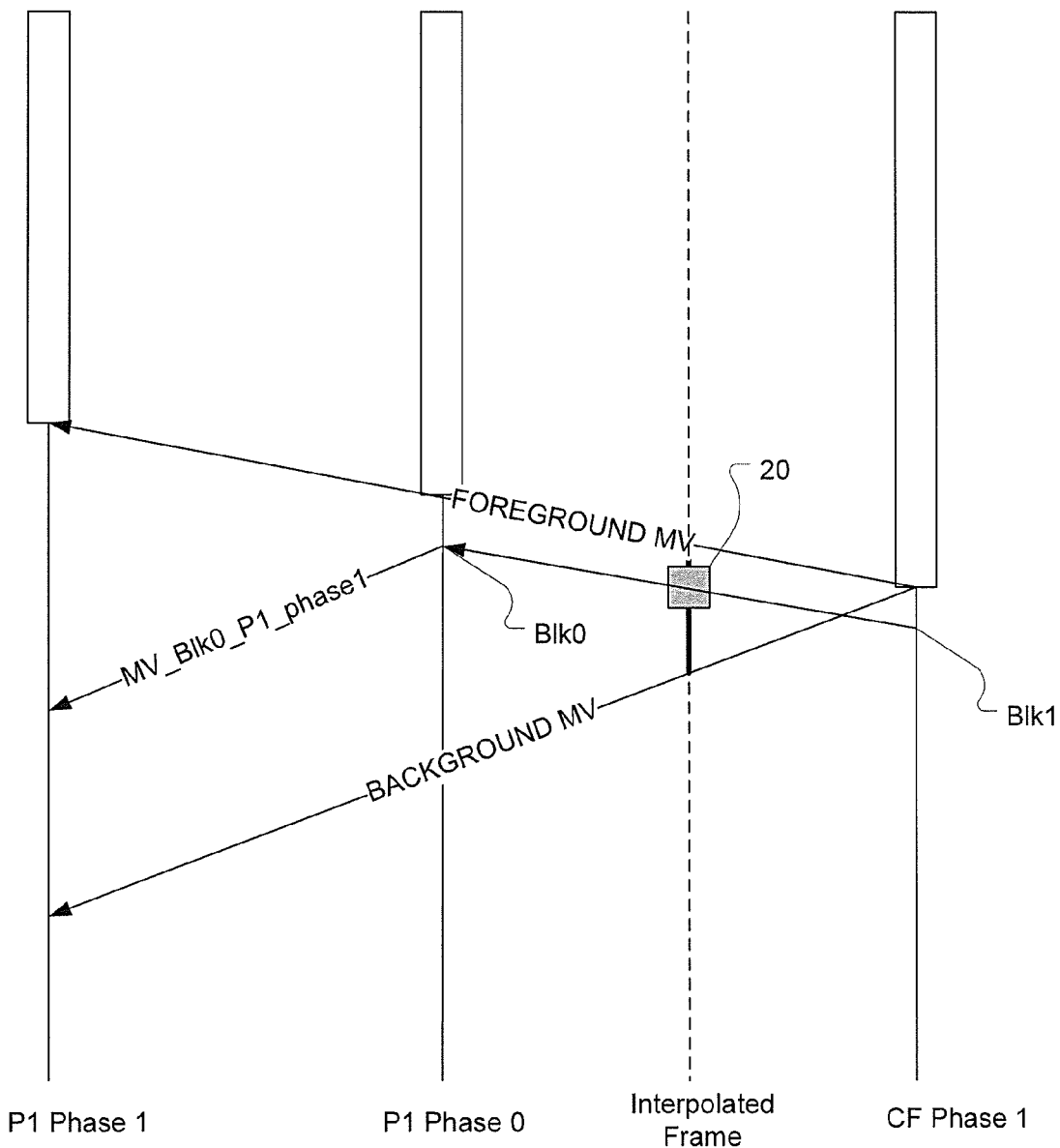
FIG. 3 shows a diagram of motion vectors for determining a background motion vector.

The information can also be used later in the frame interpolation process to control the weighting. It can also be used to select an alternative motion vector. For example, the correct motion vector in occluded regions is the background motion vector. For example, one can use the previous motion vector (P1 phase 1) and double confirm data to determine if the area is in a cover region. If the area is in the cover region, then one might want to substitute the P1 Phase 1 motion vector for the current motion vector, or use the information to generate an average background motion vector for that region. In order to use the average background motion vector, one must first determine the average background motion vector. Referring to FIG. 3, one possible method of determining the average background motion vector involves bringing in one more motion vector field. As shown in FIG. 3, the motion vector field from P1 Phase 1 is used.

In FIG. 3, the motion vector of Block 0 (Blk0) in P1 Phase 0 is not double confirmed, but the motion vector of Block 1 (Blk1) is double confirmed. The current block 20 is in the cover area. When this condition occurs, the motion vector for Blk0 for P1 Phase 1 is the background motion vector. More generally, it is the motion vector between the block that is not double confirmed and the next previous phase FIG. 3 shows a flowchart of an embodiment of this process. At 40, a set of candidate motion vectors are generated, as discussed above. At 42, the process selects the interpolated motion vector MV_Inter. The process selects the blocks for phase 1 and phase 0 at 44 and 46. The motion vectors for each block are then compared at 48 and a determination is made at 50 as to whether or not they match. If both sets of motion vectors match, the region is not occluded at 54. If both sets do not match, the region is occluded at 52. If the region is occluded, the process may continue to determine a background motion vector at 56 that may be used in further processing.

Many variations and options exist with regard to this process, some of which have been mentioned above, such as the generation of the candidate motion vectors and how the selection of an interpolated motion vector is made. Another variation is at which block the process starts, the block at the head or the tail of the motion vector. One can alter the threshold that determines whether the motion vectors have a small enough difference.

One possible variation would have only one set of motion vector confirmation for one or the other of the head or tail of the interpolated motion vector. However, as FIG. 2 showed, situations can exist in which one set of motion vectors confirm and the other does not. Double confirmation would seem a more accurate option.

Figure 4:
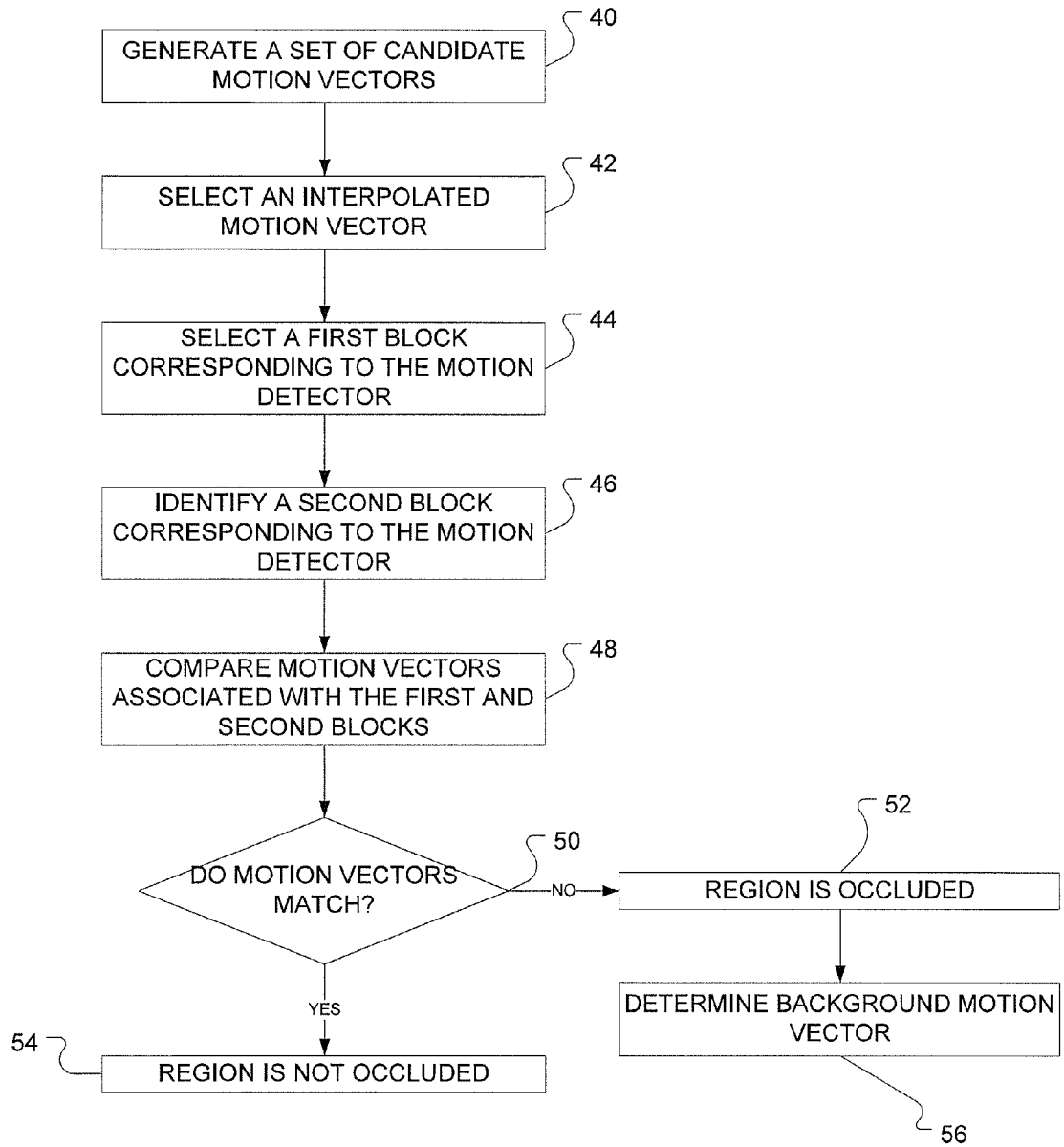
FIG. 4 shows a flowchart of an embodiment of a method of identifying occluded regions in images.
Figure 5:
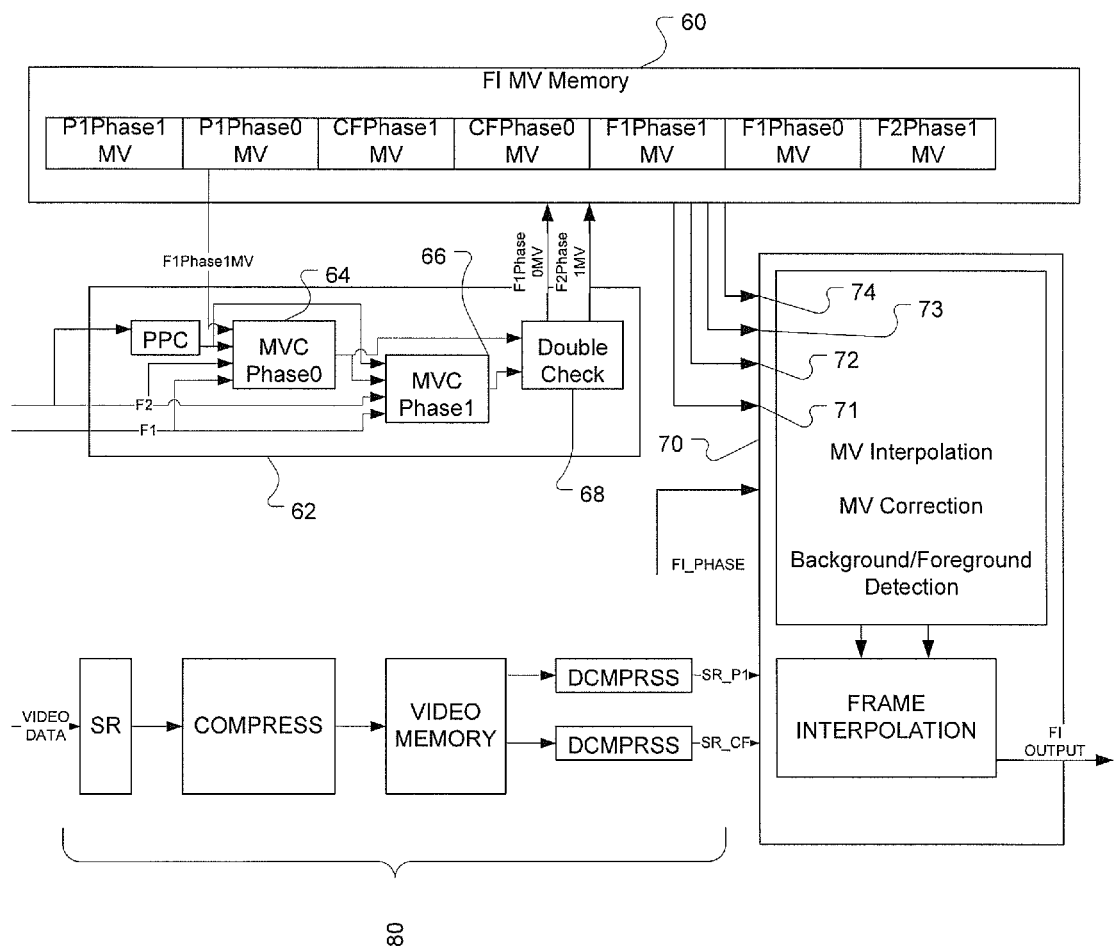
FIG. 5 shows a block diagram of an apparatus used to perform motion vector processing to determine occluded regions.

Many different devices may implement the processes discussed here. For example, a general purpose processor may perform the methods, as well as a dedicated video processor, or a video post processor. FIG. 4 shows one embodiment of a system that can perform the methods discussed here. In FIG. 4, a lower path 70 takes in the video data and performs the necessary processing on the data to produce the image data.

A frame memory 60 stores the phases for various frames of data after they have undergone Fourier transformation. While the example of FIG. 4 shows the previous frame (P1), the current frame (CF), and the next two frames (F1, F2) and their two phases, the frame memory stores any combination of data needed for a particular implementation. The motion vector confirmation module 62 would implement the double confirmation of the motion vectors discussed here, using the motion vector phase modules MVC Phase0 and MVC Phase 1, as well as the double check module 68. The results are stored in the frame memory and provided when needed to the interpolation module 70, through data lines 71-74.

In this manner, the process identifies regions of an interpolated frame of video data in which occlusions exist. This allows applications of more detailed algorithms and processing to ensure that the process selects an accurate motion detector. This results in a more accurate interpolated frame that in turn leads to a better quality image.

Thus, although there has been described to this point a particular embodiment for a method and apparatus for identifying occluded regions in images, it is not intended that such specific references be considered as limitations upon the scope of this invention except in-so-far as set forth in the following claims.

What is claimed is:

1. A method of identifying regions of an image requiring motion vector processing, comprising:
   generating a set of candidate interpolated motion vectors for an interpolation phase of an image to be used for an analyzed phase;
   selecting an interpolated motion vector from the set of candidate interpolated motion vectors;
   selecting a first block in a first phase corresponding to a first end of the interpolated motion vector;
   identifying a second block in the second phase corresponding to a second end of the interpolated motion vector;
   comparing a first phase motion vector of the first block to a second phase motion vector of the first block to determine if the first block is confirmed;
   comparing a first phase motion vector of the second block to a second phase motion vector of the second block to determine if the second block is confirmed; and
   indicating whether the region associated with the interpolated motion vector is an occluded region.

2. The method of claim 1, further comprising performing further processing on the occluded region.

3. The method of claim 1, wherein the analyzed phase is located at one of the first interpolation phase, the second interpolation phase or at a location between the first and second interpolated phases.

4. The method of claim 1, wherein the identifying, determining, and comparing is performed on multiple motion vectors for the first block before indicating the region as being an occluded region.

5. The method of claim 1, wherein the region corresponds to a block.

6. The method of claim 1, wherein the region is larger than a block.

7. The method of claim 1, wherein comparing a first phase motion vector of the first block to a second phase motion vector of the first block comprises finding a difference between the first and second motion vectors.

8. The method of claim 7, wherein comparing further comprises determining if the difference is below a threshold.

9. The method of claim 1, further comprising determining a background motion vector if the region is occluded.

10. An apparatus, comprising:
    a phase plane conversion module to convert image data into at least two phases, a current phase and a previous phase;
    a first phase motion vector calculation module to generate a first phase motion vector field;
    a second phase motion vector calculation module to generate a second phase motion vector field; and
    a double check module to determine which vectors in the first and second phase motion vector fields are double confirmed and to identify regions in which the motion vectors are not double confirmed as occluded.

11. The apparatus of claim 10, further comprising a third phase motion vector calculation module to generate a third phase motion vector field.

12. The apparatus of claim 11, the double check module further to determine a background motion vector for regions that are occluded.

* * * * *